(12) United States Patent
Blank et al.

(10) Patent No.: US 12,495,731 B2
(45) Date of Patent: Dec. 16, 2025

(54) CUTTER BAR SKID SHOE FOR AN AGRICULTURAL HARVESTER HEADER

(71) Applicant: CNH Industrial America LLC, New Holland, PA (US)

(72) Inventors: Mitchell Blank, Lancaster, PA (US); Joel T. Cook, Akron, PA (US); Joseph R. Best, Leola, PA (US); David V. Dobbins, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 752 days.

(21) Appl. No.: 17/864,084

(22) Filed: Jul. 13, 2022

(65) Prior Publication Data

US 2023/0013518 A1    Jan. 19, 2023

Related U.S. Application Data

(60) Provisional application No. 63/222,082, filed on Jul. 15, 2021.

(51) Int. Cl.
*A01D 34/14* (2006.01)
*A01D 34/30* (2006.01)

(52) U.S. Cl.
CPC .............. *A01D 34/14* (2013.01); *A01D 34/30* (2013.01)

(58) Field of Classification Search
CPC ......... A01D 34/14; A01D 34/30; A01D 41/14
See application file for complete search history.

(56) References Cited

U.S. PATENT DOCUMENTS

| | | | | |
|---|---|---|---|---|
| 41,556 | A * | 2/1864 | Wheeler, Jr. | A01D 34/03 56/267 |
| 83,628 | A * | 11/1868 | Hallenbeck | A01D 34/13 56/298 |
| 164,676 | A * | 6/1875 | Collins | A01D 34/18 56/310 |
| 403,699 | A * | 5/1889 | Replogle | A01D 34/833 56/292 |
| 490,024 | A * | 1/1893 | King | A01D 34/14 56/302 |
| 637,639 | A * | 11/1899 | Mischler | A01D 34/17 56/305 |
| 666,111 | A * | 1/1901 | Rauber | A01D 34/02 56/264 |
| 805,155 | A * | 11/1905 | Rarig | A01D 34/30 56/296 |
| 930,617 | A * | 8/1909 | Riley | A01D 63/04 56/314 |

(Continued)

FOREIGN PATENT DOCUMENTS

| CA | 2639359 A1 | 2/2010 |
|---|---|---|
| CA | 2937639 A1 | 1/2018 |

(Continued)

*Primary Examiner* — Arpad Fabian-Kovacs
(74) *Attorney, Agent, or Firm* — Buchanan Ingersoll & Rooney PC

(57) ABSTRACT

A cutter bar skid shoe for a header of an agricultural harvester. The cutter bar skid shoe includes a skid plate having an upper surface, a lower surface, a fore end and an aft end. The cutter bar skid shoe further includes a cutter knife clip integral with and extending forwardly of the fore end of the skid plate for engaging a cutter knife blade.

20 Claims, 9 Drawing Sheets

(56) References Cited

U.S. PATENT DOCUMENTS

| | | | | |
|---|---|---|---|---|
| 2,203,982 | A * | 6/1940 | Coultas | A01D 34/16 56/305 |
| 2,577,939 | A * | 12/1951 | Wannebo | A01D 34/18 56/309 |
| 2,687,000 | A * | 8/1954 | Valentine | A01D 34/22 56/299 |
| 2,791,085 | A * | 5/1957 | Lewis | F16H 21/50 74/104 |
| 3,722,196 | A * | 3/1973 | Templeton | A01D 34/16 56/298 |
| 4,199,925 | A * | 4/1980 | Quick | A01D 41/141 56/208 |
| 4,660,360 | A * | 4/1987 | Hardesty | A01D 41/14 56/15.8 |
| 5,343,682 | A * | 9/1994 | Puncochar | A01D 34/17 56/305 |
| 5,617,712 | A * | 4/1997 | Ibach | A01D 34/17 56/307 |
| 9,861,036 | B2 | 1/2018 | Totten et al. | |
| 12,268,126 | B2 * | 4/2025 | Höller | A01D 65/02 |
| 2003/0010009 | A1 * | 1/2003 | Bickel | A01D 34/833 56/244 |
| 2005/0016151 | A1 * | 1/2005 | Lolley | A01D 34/17 56/307 |
| 2007/0204589 | A1 * | 9/2007 | Coers | A01D 61/002 56/208 |
| 2014/0165526 | A1 * | 6/2014 | Leys | A01D 34/04 56/181 |
| 2018/0007827 | A1 * | 1/2018 | Talbot | A01D 34/13 |
| 2020/0068800 | A1 * | 3/2020 | Talbot | A01D 34/14 |
| 2020/0163280 | A1 * | 5/2020 | Figgins | A01D 61/02 |

FOREIGN PATENT DOCUMENTS

| | | | | |
|---|---|---|---|---|
| CA | 3012682 A1 * | 1/2019 | | A01D 34/22 |
| DE | 10045731 A1 * | 3/2002 | | A01D 34/14 |
| DE | 102013100322 A1 * | 7/2014 | | A01D 34/00 |
| EP | 3811763 A1 * | 4/2021 | | A01D 34/04 |
| WO | WO-2019048973 A1 * | 3/2019 | | A01D 34/14 |
| WO | WO-2020146604 A1 * | 7/2020 | | A01D 34/04 |

* cited by examiner

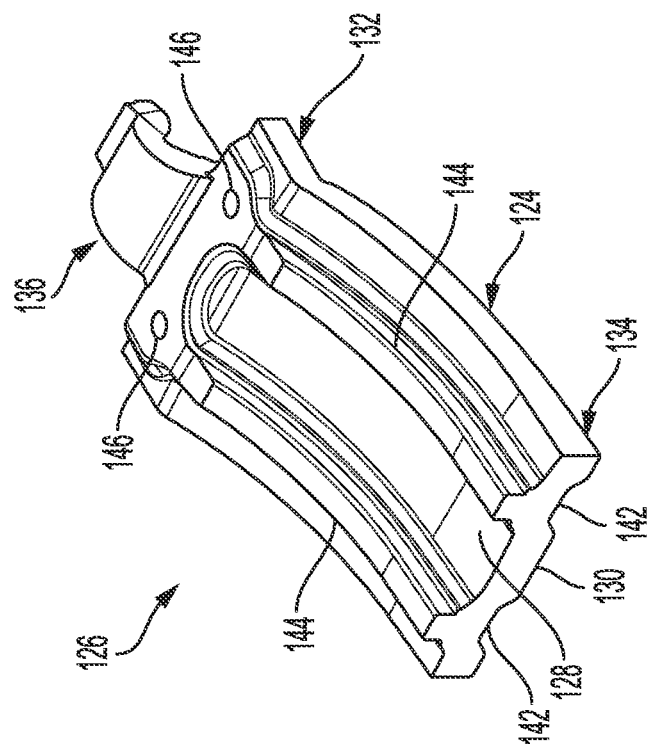
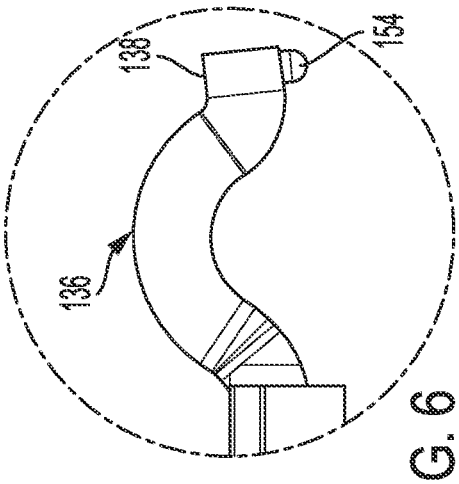
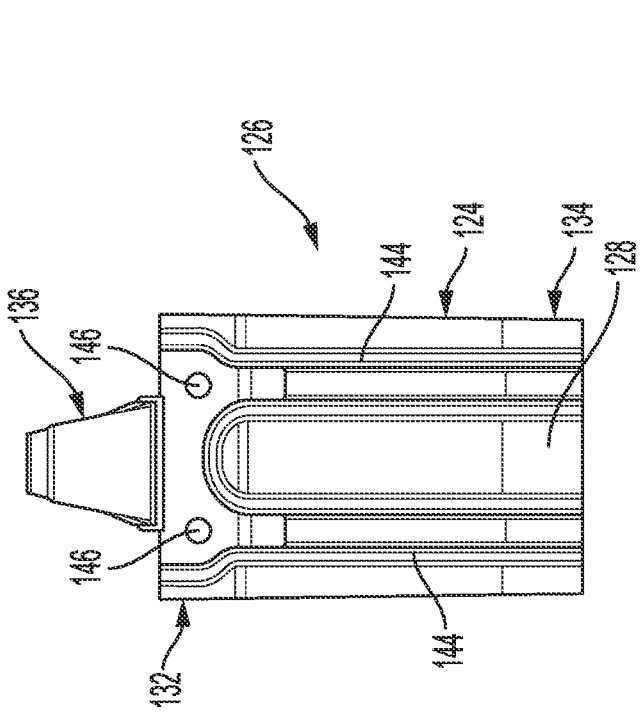
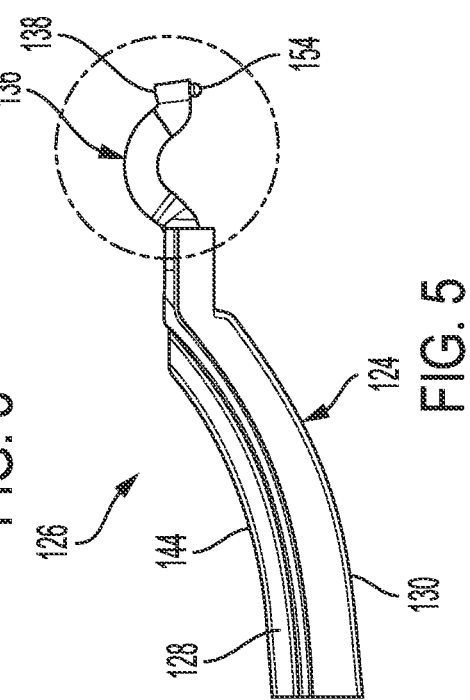

CUTTER BAR SKID SHOE FOR AN AGRICULTURAL HARVESTER HEADER

The exemplary embodiments of present invention relate generally to a header of a plant cutting machine (e.g., a combine harvester) and, more specifically, to a header including a cutter bar skid shoe.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar including a plurality of cutter knives, for severing the plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally inside the header.

Oftentimes, the header includes a plurality of skid shoes that extend downwardly and rearwardly from the cutter bar. The skid shoes are typically formed from metal, e.g., steel and facilitates the header frame to travel over the ground as the harvester traverses a field being harvested. In so doing, the skid shoes prevent the cutter bar and its associated cutter knives from encountering rocks or other hard obstacles which could cause damage thereto.

A conventional skid shoe assembly includes a metal skid shoe, a metal knife clip and a metal adjustment piece or pressure bar as separate pieces. An aft end of the knife clip is secured to a fore end of the skid shoe and a fore end of the knife clip contacts upper surfaces of one or more cutter knives to keep the cutter knives aligned with knife guards through which the knives pass. Passage of the cutter knives through slots in the knife guards shears crop material captured between the cutter knives and the knife guards. The adjustment piece is typically secured to the fore end of the skid shoe by a nut and bolt. The fore end of the adjustment piece contacts a top surface of an intermediate portion of the knife clip to maintain downward force on the fore end of the of the knife clip, whereby the knife clip remains in contact with the upper surfaces of the cutter knives.

Among the disadvantages of a conventional skid shoe assembly is that it is difficult to assemble. In particular, the assembly requires an operator to hold the knife guard on the front side of the header and the skid shoe at the bottom of the header while operating fastener tools from the top side of the header, all simultaneously with two hands. Additionally, a conventional skid shoe assembly requires the adjustment piece in order to maintain contact force or a specific gap between the knife clip and the cutter knives. As such, supplemental parts are required in order to properly install the skid shoe assembly onto the header, thereby resulting in increased installation time and effort, especially in wide headers that may include many skid shoe assemblies situated along their width. Furthermore, the adjustment pieces of conventional skid shoe assemblies require frequent pressure adjustments as the header is operated in order to maintain contact of the fore end of the knife clips with the cutter knives or a specific gap therebetween. Moreover, the metal-to-metal contact between the knife clips and the cutter knives results in vibration that is transmitted to the header frame, as well as heat-generating friction which gradually damages steel parts.

SUMMARY OF THE INVENTION

In accordance with an exemplary embodiment there is provided a cutter bar skid shoe including a skid plate having an upper surface, a lower surface, a fore end and an aft end. The cutter bar skid shoe further includes a cutter knife clip integral with and extending forwardly of the fore end of the skid plate for engaging a cutter knife blade.

An aspect of the exemplary embodiment is that the cutter bar skid shoe is formed entirely of a polymer. Another aspect of the exemplary embodiment is that a biasing member is mounted within the cutter knife clip.

In accordance with the exemplary embodiments, the problems associated with conventional skid shoe assemblies are addressed by the cutter bar skid shoe of the exemplary embodiments. When used in combination with a header of an agricultural harvester, the cutter bar skid shoe overcomes the disadvantages referenced above by providing an adjustment-free assembly that is much easier to assemble in that the operator can hold the knife guard and the cutter bar skid shoe with one hand while easily manipulating fastener tools with the other hand. In addition, supplemental parts such as adjustment pieces or pressure bars are eliminated, or at least rendered optional, thereby resulting in less installation time and effort, especially in wide headers that may include many cutter bar skid shoes situated along their width. Moreover, steel-to-steel contact between the cutter knife clips and the cutter knife blades is eliminated. Cutter bar vibration is also reduced due to its construction from a polymer, which has a lower negligible resonance frequency. Still further, heat-generating friction is greatly reduced due to the small bearing surface of the rounded tip of the knife clip against the cutter knife blades and also because of the inherent lubricity of the polymer of the knife clip which contacts the steel cutter knife blades.

Other features and advantages of the subject disclosure will be apparent from the following more detailed description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

FIG. 3 is a top plan view of a first exemplary embodiment of a cutter bar skid shoe in accordance with the subject disclosure;

FIG. 4 is a top rear perspective view of the cutter bar skid shoe of FIG. 3;

FIG. 5 is a side view of the cutter bar skid shoe of FIG. 3;

FIG. 6 is an enlarged side view of a cutter knife clip of the cutter bar skid shoe of FIG. 3;

DETAILED DESCRIPTION OF THE DRAWINGS

Figure 1:
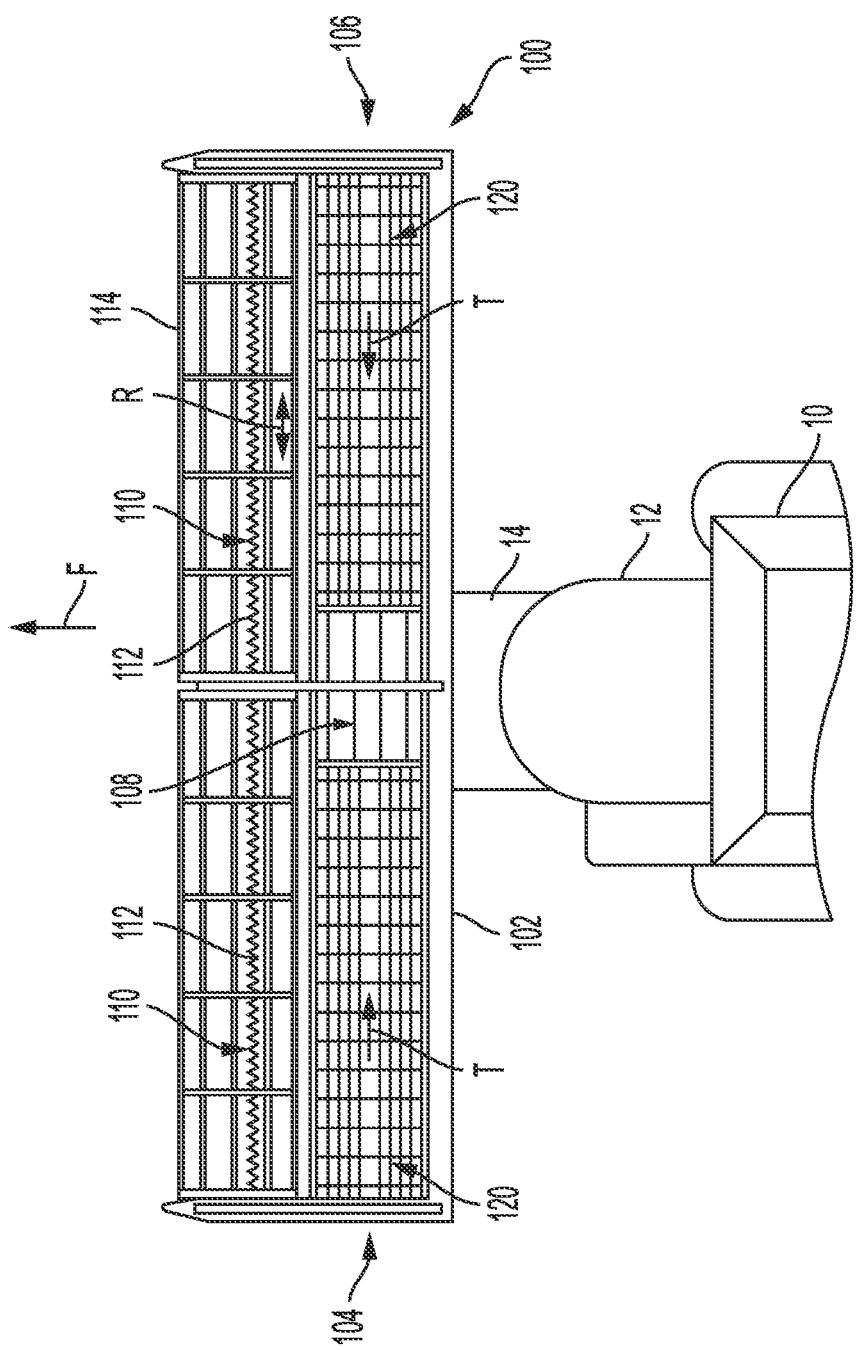
FIG. 1 is a top view of an agricultural harvester and a header in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 2:
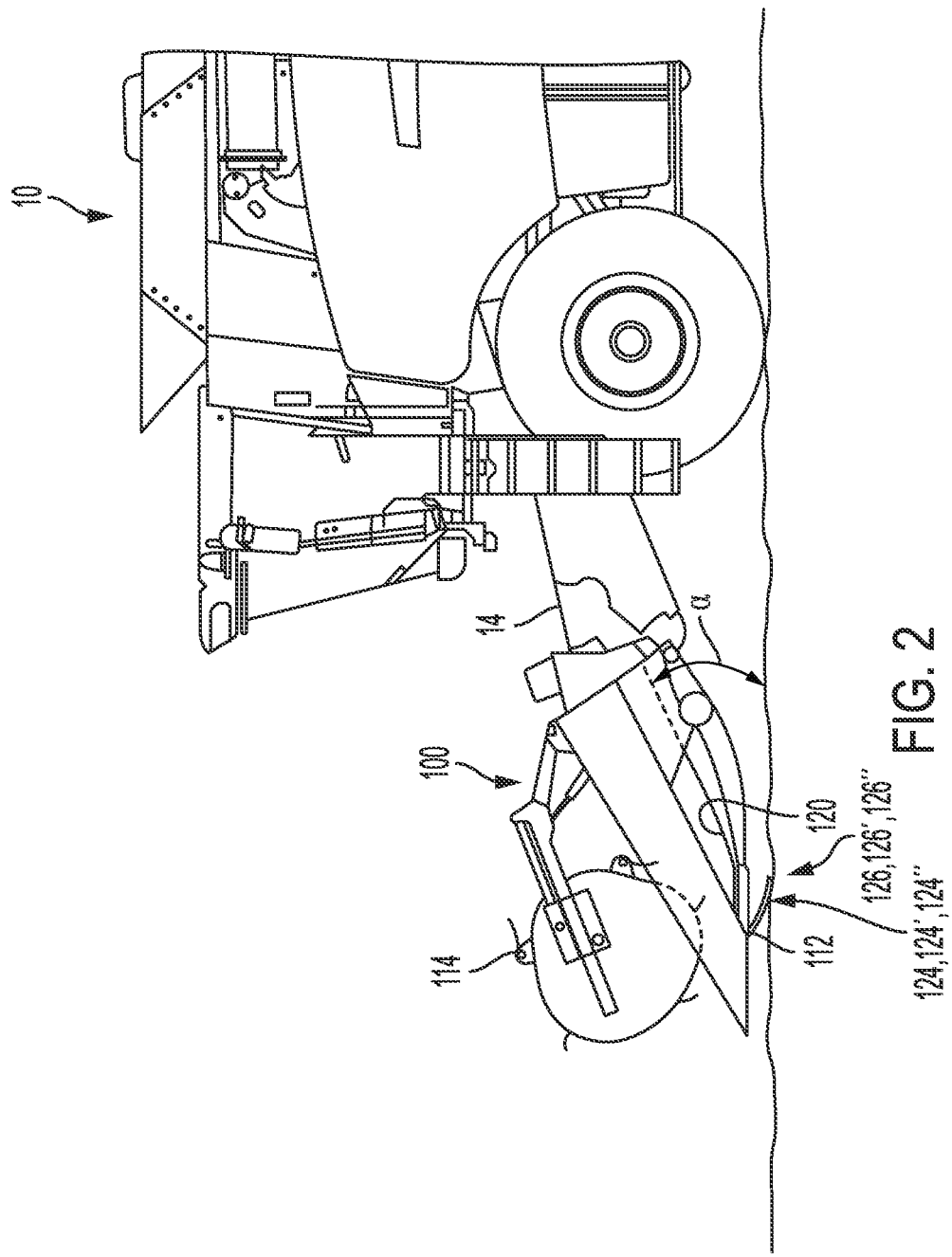
FIG. 2 is a side view of the agricultural harvester and header of FIG. 1.
Figure 7:
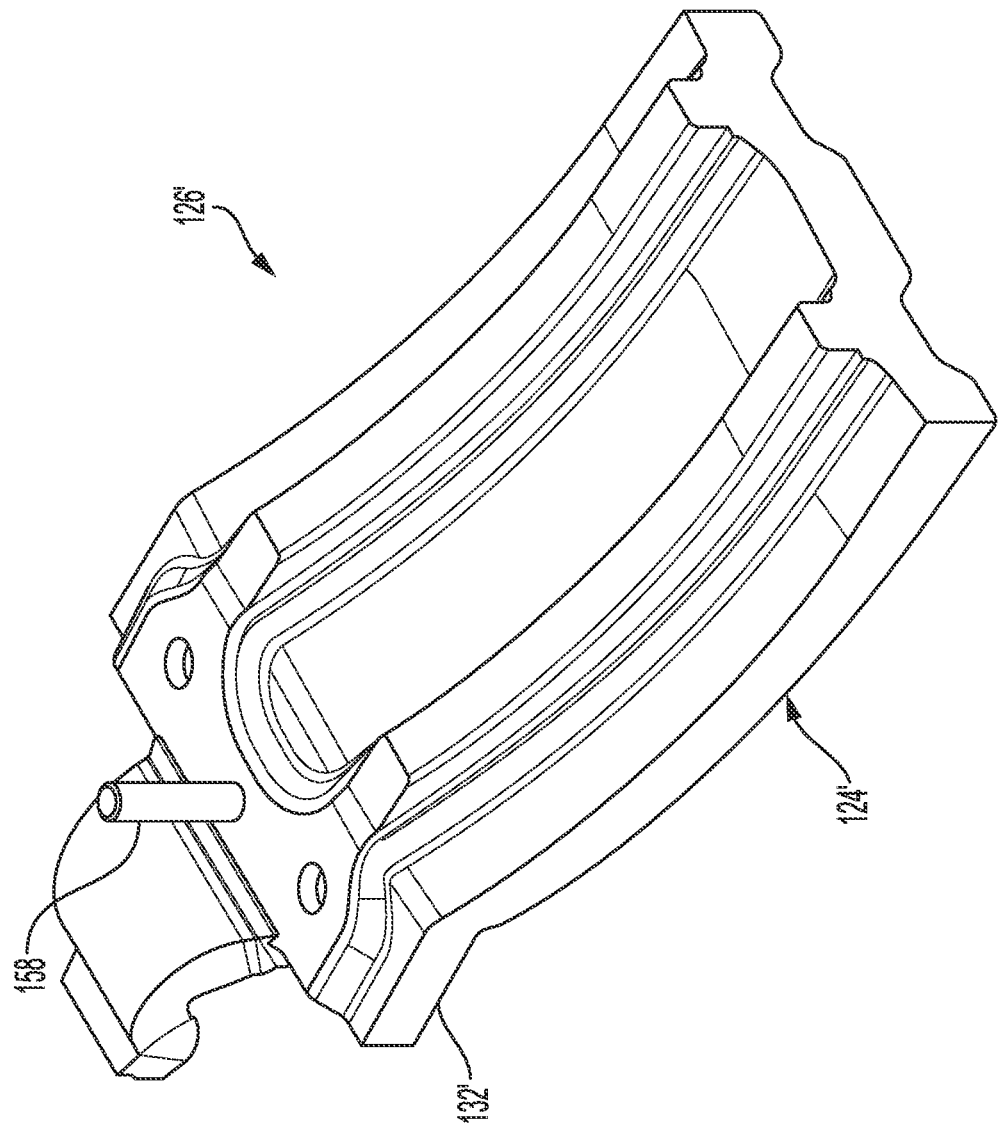
FIG. 7 is a top rear perspective view of a second exemplary embodiment of a cutter bar skid shoe in accordance with the subject disclosure.
Figure 8:
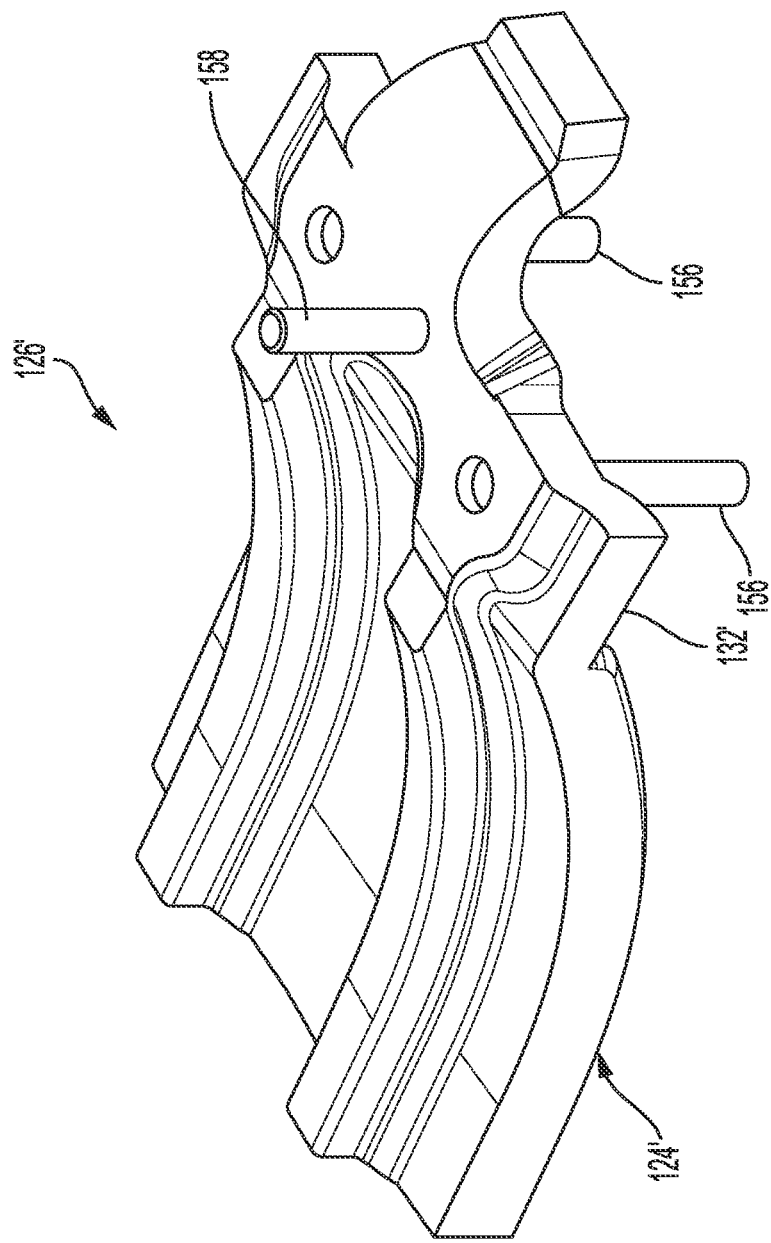
FIG. 8 is a top front perspective view of the cutter bar skid shoe of FIG. 7.
Figure 9:
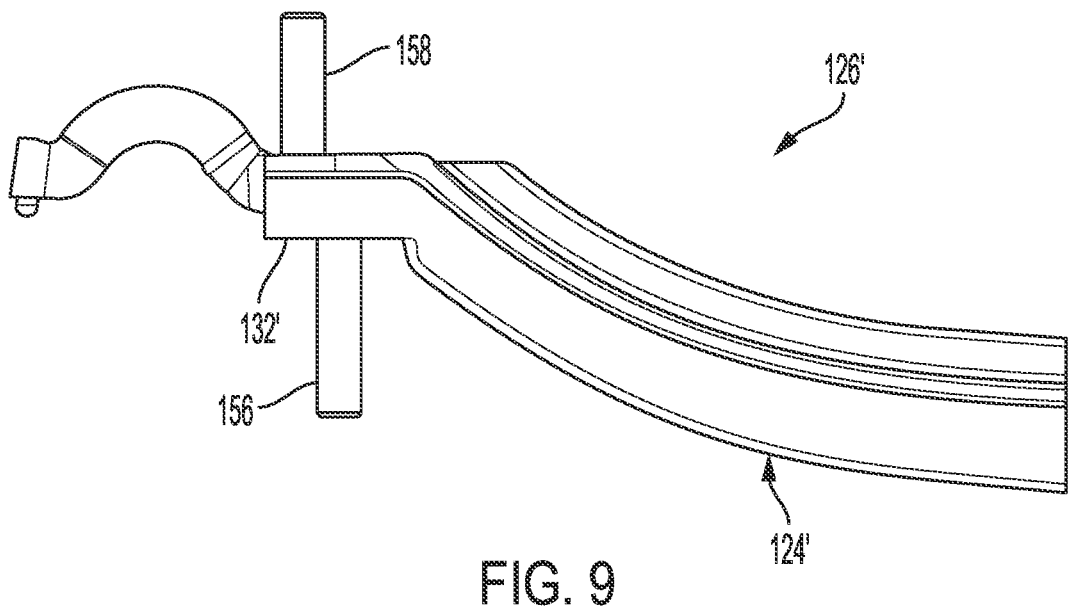
FIG. 9 is a side view of the cutter bar skid shoe of FIG. 7.
Figure 10:
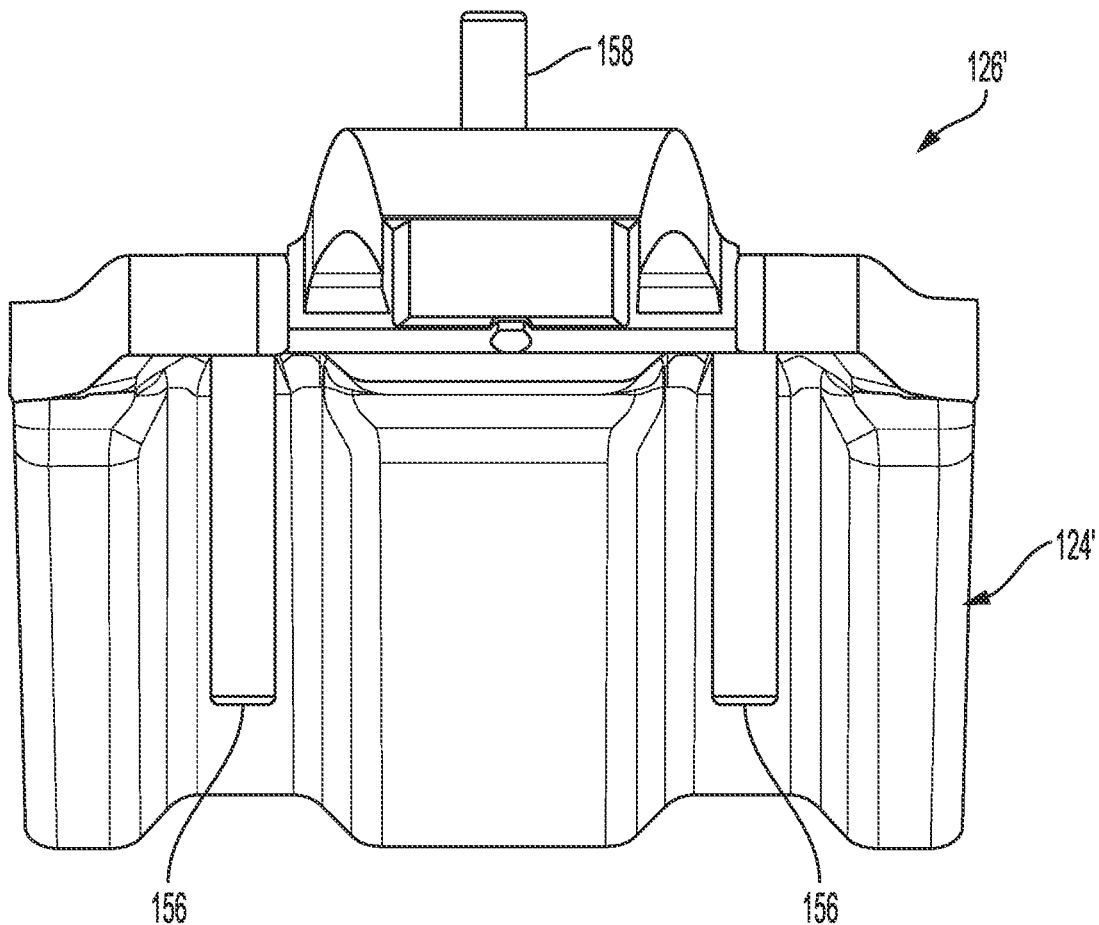
FIG. 10 is a front view of the cutter bar skid shoe of FIG. 7.

Referring now to the drawings, and more particularly to FIGS. 1 and 2, there is shown an exemplary embodiment of an agricultural vehicle 10 in the form of, e.g., a combine harvester or agricultural harvester which generally includes a chassis 12, a feeder housing or feederhouse 14, and an attachment in the form of a header 100. Typically, the agricultural harvester 10 includes additional internal systems for the separation and handling of collected crop material. However, a detailed discussion of these additional systems is not essential for a full and proper understanding of the subject disclosure.

The header 100 is coupled to and supported by the chassis 12 of the agricultural vehicle 10 by, for example, coupling to the feeder housing 14. In the exemplary, but non-limitative, embodiment shown, the header 100 is in the form of a draper header to harvest bushy or fluffy crop material. The header 100 has a frame 102 coupled to the chassis 12 by coupling to the feeder housing 14 and a pair of opposed lateral ends 104, 106. The header frame 102 carries one or more oscillating cutter bars 110 including a plurality of cutter knife blades 112 to cut crop material as the agricultural vehicle 10 travels in a forward direction, denoted by arrow "F". The oscillating or reciprocating cutter knife blades 112, which may be referred to as cutting elements, can be reciprocated back-and-forth in a lateral direction, denoted by arrow "R", relative to the forward direction F in a known manner, e.g., by a wobble box, epicyclic drive, etc. Exemplary cutting elements applicable to the present exemplary embodiments are disclosed, e.g., in U.S. Pat. Nos. 7,730,709 and 8,151,547, the entire disclosures of which are incorporated by reference herein in their entirety for all purposes.

The header 100 can further include a center feed belt 108 or a center auger that conveys the crop material into the feeder housing 14. The header 100 may also include one or more lateral, flexible draper belts 120 that are positioned rearwardly of the cutter bar assemblies 110 and travel, e.g. rotate, in opposing directions of travel, denoted by each arrow "T", in order to convey crop material inwardly to the center feed belt 108 and thereby the feeder housing 14. The header 100 may also include a rotating reel 114 with tines or the like to sweep the crop material inwardly towards the draper belts 120. As best shown in FIG. 2, the draper belts 120 are upwardly inclined from their forward edge to their rearward edge at an angle "a" of about 5 to 30 degrees relative to horizontal. FIG. 2 also shows that the header includes downwardly and rearwardly extending skid plates 124, 124' or 124" of exemplary unitary cutter knife clip and skid shoe assemblies or cutter bar skid shoes 126, 126' or 126", described in greater detail below.

Figure 11:
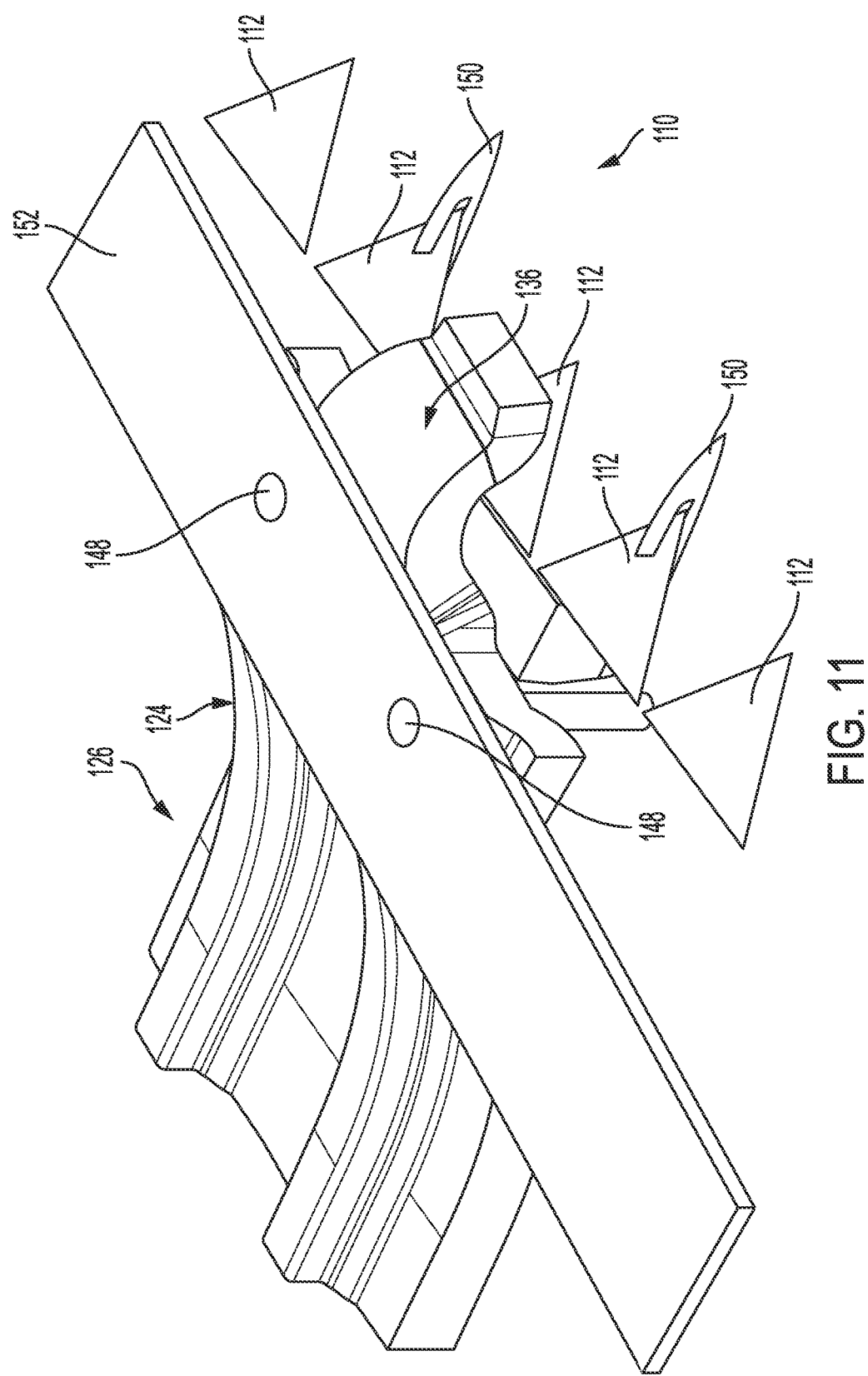
FIG. 11 is a top perspective view of the cutter bar skid shoe of FIGS. 3-6 and a cutter bar in an assembled condition.

Referring to FIGS. 3-6, there is shown an exemplary embodiment of a cutter bar skid shoe 126 in accordance with an exemplary embodiment of the subject disclosure. The cutter bar skid shoe 126 includes a skid plate 124 having an upper surface 128, a lower surface 130, a fore end 132 and an aft end 134. The cutter bar skid shoe further includes a cutter knife clip 136 integral with and extending forwardly of the fore end of the skid plate for engaging a cutter knife blade 112 (FIG. 11).

The skid plate 124 is upwardly curved from the aft end 134 to the fore end 132. So configured, the skid plate allows the cutter bar to slide over the ground surface if contact is made and causes the cutter bar of the header to remain above the ground surface whereby rocks and other hard obstacles do not contact the cutter knife blades as the agricultural harvester traverses a field being harvested, as well as provide a set cutting height above the ground. According to an aspect, the skid plate further comprises at least one groove 142 formed in the lower surface 130 and at least one rib 144 provided on the upper surface 128 and extending along a length of the skid plate. The rib is in substantial vertical alignment with the groove. So configured, the ribs and grooves serve to strengthen or rigidify the skid shoe for enhanced durability. In the present exemplary embodiment, the skid plate includes a pair of spaced apart grooves 142 and a pair of spaced apart ribs 144 in substantial vertical alignment with the grooves.

In addition, the skid shoe 124 includes a pair of spaced apart apertures 146 in the fore end 132 for receiving fasteners 148 (FIG. 11) such as, e.g., threaded bolts. As also shown in FIG. 11, the fasteners secure the cutter bar skid shoe 126 to cutter knife guards 150 and a cutter bar plate 152 of the cutter bar 110 which, in turn, is secured to the header frame 102.

The integral cutter knife clip 136 of the cutter bar skid shoe 126 is arch-shaped as best shown in FIG. 5. Further, FIGS. 5 and 6 show that the fore end 138 of the cutter knife clip includes at least one downwardly directed rounded tip 154 which allows for contact with the at least one oscillating cutter knife blade 112, in the manner shown in FIGS. 12 and 13.

In all embodiments of the cutter bar skid shoe herein disclosed, one or both of the skid plate and cutter knife clip is formed from a high strength and durable polymer such as, e.g., polyethylene, and preferably ultra high molecular weight polyethylene (UHMWPE) or crosslinked ultra high molecular weight polyethylene. For ease and simplicity of manufacturing the cutter bar skid shoe can be formed entirely of polymer. Constructed as such, the downwardly directed rounded tip 154, or plurality of tips, at the fore end 138 of the cutter knife clip 136 results in the polymer tip contacting the upper surfaces of steel cutter knife blades 112. Consequently, cutter bar vibration is reduced due to the polymer's lack of or low resonance frequency. Still further, heat-generating friction is greatly reduced due to the small bearing surface in contact surface area of the rounded tip of the knife clip against the cutter knife blades and also because of the inherent lubricity of the polymer of the knife clip which contacts the steel cutter knife blades. That is, the polymer, e.g. UHMWPE, which has a high surface energy thereby providing low friction engagement.

FIGS. 7-10 show another exemplary embodiment of a cutter bar skid shoe 126' according to the subject disclosure.

According to this exemplary embodiment, the cutter bar skid shoe 126' comprises a fastener, e.g., at least one threaded bolt 156 downwardly depending from the fore end 132' of the skid plate 124'. According to an aspect, the at least one threaded bolt 156 is carried by the fore end of the skid plate. In addition, the cutter bar skid shoe 126' can further comprise another fastener, e.g., a threaded bolt 158 upwardly extending from the fore end of the skid plate. According to an aspect, the threaded bolt 158 is carried by the fore end of the skid plate. In all other respects, including the construction of the cutter knife clip 136' and the remainder of the skid plate 124', the cutter bar skid shoe 126' is essentially the same as the cutter bar skid shoe 126.

Figure 12:
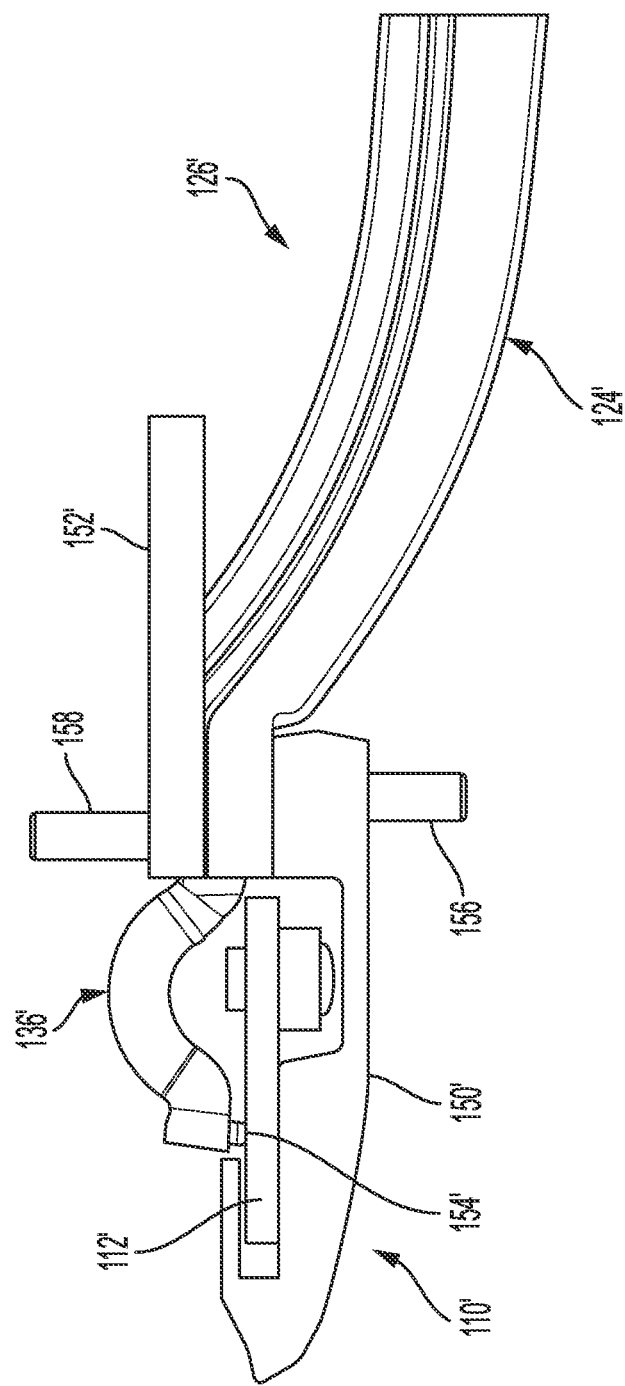
FIG. 12 is a side view of the cutter bar skid shoe of FIGS. 7-10 and a cutter bar in an assembled condition.

FIG. 12 shows the cutter bar skid shoe 126' and cutter bar 110' in an assembled condition. The cutter bar 110' includes a cutter knife blade 112', a cutter bar plate 152' and a knife guard 150'. The cutter bar skid shoe 126' is mounted to the cutter bar between the cutter bar plate and the knife guard. The cutter knife clip 136' engages or is engageable with the cutter knife blade 112' e.g., via the downwardly directed rounded tip 154'. Additionally, the fasteners 156, 158 of the cutter bar skid shoe 126' secure the cutter bar skid shoe to the cutter bar 110'. In particular, the fasteners secure the fore end of the skid plate 124' to the cutter bar. Optionally, the fasteners 156, 158 could extend up to the cutter bar to enhance attachment strength. So constructed, the fore end of the skid plate is adjacent an aft end of the cutter knife blade.

Figure 13:
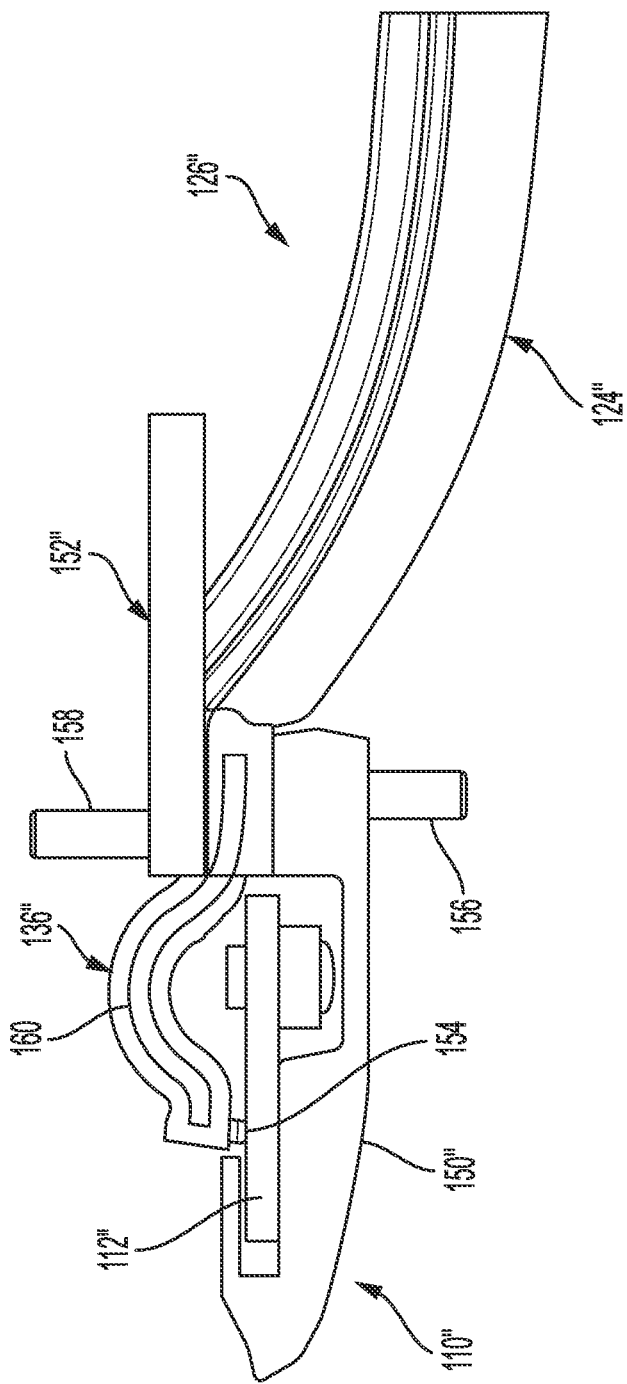
FIG. 13 is a side view, in partial cross-section, of a third exemplary embodiment of a cutter bar skid shoe in accordance with the subject disclosure, and a cutter bar in an assembled condition.

FIG. 13 shows another exemplary embodiment of a cutter bar skid shoe 126" according to the subject disclosure. In many respects, the cutter bar skid shoe 126" is similar in construction to the cutter bar skid shoe 126'. Accordingly, for brevity only those aspects of the cutter bar skid shoe 126" which materially depart in structure and/or function from the cutter bar skid shoe 126' will be described in detail. In this regard, the cutter knife clip 136" includes a biasing member 160. According to an aspect, the biasing member is a leaf spring mounted within the cutter knife clip, preferably completely housed within the cutter knife clip. The leaf spring biasing member is arch-shaped and arranged to exert a downwardly force on the at least one oscillating cutter knife blade 112". The leaf spring extends substantially the entire longitudinal extent of the cutter knife clip.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

What is claimed is:

1. A cutter bar skid shoe for a harvester header comprising:
   a skid plate having an upper surface, a lower surface, a fore end and an aft end; and
   a cutter knife clip integral with and extending forwardly of the fore end of the skid plate for engaging a cutter knife blade.

2. The cutter bar skid shoe of claim 1, wherein the skid plate and cutter knife clip is formed from a polymer.

3. The cutter bar skid shoe of claim 1, wherein the skid plate is formed from polyethylene.

4. The cutter bar skid shoe of claim 3, wherein the polyethylene is ultra high molecular weight polyethylene.

5. The cutter bar skid shoe of claim 3, wherein the polyethylene is crosslinked ultra high molecular weight polyethylene.

6. The cutter bar skid shoe of claim 1, wherein the cutter knife clip is formed from polyethylene.

7. The cutter bar skid shoe of claim 6, wherein the polyethylene is ultra high molecular weight polyethylene.

8. The cutter bar skid shoe of claim 6, wherein the polyethylene is crosslinked ultra high molecular weight polyethylene.

9. The cutter bar skid shoe of claim 1, wherein the cutter knife clip includes a biasing member.

10. The cutter bar skid shoe of claim 9, wherein the biasing member is a leaf spring mounted within the cutter knife clip.

11. The cutter bar skid shoe of claim 9, wherein the biasing member is completely housed within the cutter knife clip.

12. The cutter bar skid shoe of claim 1, wherein the skid plate comprises at least one rib extending along a length of the skid plate.

13. The cutter bar skid shoe of claim 1, wherein the cutter knife clip is arch-shaped.

14. A header for an agricultural harvester comprising:
a frame;
a cutter bar including a cutter knife blade carried by the frame; and
the cutter bar skid shoe of claim 1 mounted to the cutter bar.

15. The header of claim 14, wherein the cutter bar further includes a cutter bar plate and a knife guard, and wherein the cutter bar skid shoe is mounted to the cutter bar between the cutter bar plate and the knife guard, and wherein the skid plate is sandwiched between the cutter bar plate and the knife guard, and wherein the cutter bar plate is mounted to the upper surface of the skid plate and the knife guard is mounted to the lower surface of the skid plate.

16. The header of claim 14, wherein the cutter knife clip engages the cutter knife blade.

17. The header of claim 14, wherein the fore end of the skid plate is adjacent an aft end of the cutter knife blade.

18. The header of claim 14, wherein the cutter bar skid shoe further comprises a fastener for securing the cutter bar skid shoe to the cutter bar.

19. The header of claim 18, wherein fastener secures the fore end of the skid plate to the cutter bar.

20. An agricultural harvester comprising the header of claim 14.

* * * * *